Patented Aug. 17, 1943

2,327,212

UNITED STATES PATENT OFFICE 2,327,212

ELECTRICAL INSULATION

Winton I. Patnode, Schenectady, N. Y., assignor to General Electric Company, a corporation of New York No Drawing. Application December 19, 1939, Serial No. 310,031

2 Claims. (Cl. 260—36)

My invention relates to electrical insulation suitable for insulating electrical coils, and particularly to a flexible tape comprising a polyvinyl acetal resin formed by reacting an aldehyde with a hydrolyzed polymerized vinyl ester, such as vinyl acetate.

The insulation of many types of electrical apparatus is carried out with the aid of tapes made from rubber, mica, paper, textiles, varnished cloth, etc. The taped electrical apparatus, such as a taped coil, may or may not be further treated with varnish. The chief reason for using tape is a mechanical one; a tape is readily applied, is convenient for application by hand, and is simple to manufacture. However, to be useful, a tape must be fairly limp so that it may be readily wrapped around irregularly shaped bodies and must possess a certain degree of elasticity, resiliency and extensibility in order that it will snugly fit the body about which it is wrapped. A stiff, springy tape is unsuitable for many applications. Furthermore, in most applications the tape should have form stability and resistance to deformation at the operating temperature of the electrical apparatus as well as good dielectric properties.

These mechanical and thermal requirements have thus far limited the use of a number of synthetic resinous materials which otherwise have inherently useful and desirable properties. The polyvinyl acetal resins have been in this class in that they possess excellent dielectric properties although they are not flexible in sheet or tape form unless plasticized to such an extent as to render them too soft for use at the temperature of operation of many types of apparatus. Further, the large proportions of plasticizer required to impart to the tape the desired mechanical properties also deleteriously affects the electrical properties of the polyvinyl acetal resin and renders the tape permanently soft. Attempts have been made to extract the plasticizer from the tape after it is in place but this has proven difficult without the formation of blisters and breaks in the finished structure. Hence, the use of these resins as electrical insulation has been practically restricted to those applications in which the resin could be applied as a liquid coating composition and subsequently hardened by heat or to those applications in which a molded or preformed insulation could be used.

It is an object of my invention to provide a flexible, limp, elastic, electrically-insulating tape capable of being shrunk and converted to a hard, rigid form after application to its intended use.

Another object of my invention is to provide an insulation in tape form which after heat treatment is tough and abrasion resistant.

A further object of my invention is to provide a tape of polyvinyl acetal resins capable of being applied to objects of irregular shape in the manner of ordinary insulating tapes.

I have found that a tape having the above-described desirable properties may be produced by adding suitable quantities of monomeric methyl methacrylate to the polyvinyl acetal resins, which polyvinyl acetal resins include the formaldehyde-, acetaldehyde-, and butylaldehyde-condensation products of a partially or completely hydrolyzed polyvinyl ester such as polyvinyl acetate, or mixtures thereof. The comparatively inexpensive methyl methacrylate may be compounded with the polyvinyl acetal resin before the resin is made into a tape or it may be introduced into the polyvinyl acetal resin after it has been made into a tape or foil as by soaking the tape or foil in the liquid monomer for a suitable time.

In accordance with the first method, the polyvinyl acetal resin, preferably in powdered form, is moistened with an equal weight or less of the monomeric methyl methacrylate and is then thoroughly mixed on a cold rubber mill or rolls. The mixture is taken from the mill in the form of a tough, elastic, extensible sheet which may be cut to tape form with or without additional rolling to decrease the thickness of the sheet. Alternatively the product of the rubber mill may be extruded, or otherwise formed into a tape or foil of the required dimensions.

In practicing the second method, a previously-formed tape of the poly vinyl acetal resin is soaked in or similarly treated with the liquid monomeric methyl methacrylate until the desired amount of the monomer has been taken up by the tape. The effect of the methyl methacrylate on the polyvinyl acetal product is strikingly illustrated in this method. Whereas the original tape, although flexible, is nevertheless hard, stiff, non-extensible and springy and comparable to ordinary motion picture film in its physical properties, the treated tape is limp, non-springy, elastic, flexible, and capable of being elongated to twice its original length. Because of these properties the polyvinyl acetal tape softened by the monomeric methyl methacrylate can be readily wound upon any irregular shaped coil or conductor wherever ordinary tape has previously been used. The desirable properties of softness, flexibility, and extensibility or elasticity of the product are increased by increasing the proportion of methyl methacrylate. However, the methyl methacrylate content should ordinarily not exceed 50 per cent of the composition, preferably ranging between 30 and 50 per cent of the whole.

After the tape has been applied to the electrical apparatus, as for instance a form wound coil of rectangular conductors suitable for a high voltage generator, it is heated to a temperature of from 80 to 100° C. to convert the soft, limp tape into a hard, rigid, compact insulation shrunk onto the underlying structure. A suitable binding tape such as a linen tape may be applied over this polyvinyl acetal tape prior to the heat treatment. This binding tape may alternatively take the form of a layer of aluminum foil covered with a layer of vulcanized rubber tape applied under tension. Suitable pressure may also be applied through the medium of a heated fluid in which the coil has been immersed and which in turn is held under hydraulic pressure.

The heat treatment, with or without the pressure treatment, polymerizes the monomeric methyl methacrylate to produce a hard, tough, void-free sheath which in the case of certain of the polyvinyl acetal resins, is harder at 100° C. than is the resin alone. The insulating sheath furthermore comprises a resinous material of high dielectric properties free from any materials, such as ordinary plasticizers, which might tend to exude from the sheath at elevated temperatures.

It is obvious that the tape may take the form of a fibrous backing of glass, cotton or other fabric coated and impregnated with the polyvinyl acetal-methyl methacrylate combination although any fabric backing will to some extent decrease the extensibility of the final tape in accordance with the properties of the particular backing used.

It is to be understood that the foregoing detailed description is given by way of illustration. Variations may be made therein without departing from the spirit of my invention.

What I claim as new and desire to secure by Letters Patent of the United States, is:

1. A flexible, elastic, extensible tape capable of being heat-treated to a tough, hard, and abrasion-resistant state, the said tape consisting of a polyvinyl acetal resin and, as a plasticizer for said resin, from 30 to 50 per cent by weight of monomeric methyl methacrylate.

2. A flexible, elastic, electrically insulating tape consisting of a polyvinyl acetal resin and, as a plasticizer for said resin, from 30 to 50 per cent by weight of liquid methyl methacrylate, the said tape having the property of being elongated or stretched to substantially twice its original length.

WINTON I. PATNODE.